United States Patent
Krishnan

(10) Patent No.: US 7,479,519 B2
(45) Date of Patent: Jan. 20, 2009

(54) CURABLE URETHANE POLYMER ADHESIVES AND COATINGS

(75) Inventor: Venkataram Krishnan, Research Triangle Park, NC (US)

(73) Assignee: Mallard Creek Polymers, Inc., Charlotte, NC (US)

( * ) Notice: Subject to any disclaimer, the term of this patent is extended or adjusted under 35 U.S.C. 154(b) by 450 days.

(21) Appl. No.: 11/260,854

(22) Filed: Oct. 27, 2005

(65) Prior Publication Data

US 2006/0100349 A1    May 11, 2006

Related U.S. Application Data

(60) Provisional application No. 60/622,635, filed on Oct. 27, 2004.

(51) Int. Cl.
*C08L 29/04* (2006.01)

(52) U.S. Cl. ...................... 524/503; 524/507

(58) Field of Classification Search ............. 524/503, 524/507
See application file for complete search history.

(56) References Cited

U.S. PATENT DOCUMENTS

| 4,265,796 | A |   | 5/1981  | Mueller-Mall et al. |
| 5,141,983 | A |   | 8/1992  | Hasegawa et al. |
| 5,308,910 | A | * | 5/1994  | Yuki et al. .......... 524/503 |
| 5,629,370 | A |   | 5/1997  | Freidzon |
| 5,830,934 | A |   | 11/1998 | Krishnan |
| 5,834,538 | A |   | 11/1998 | deHullu et al. |
| 5,900,451 | A |   | 5/1999  | Krishnan et al. |

* cited by examiner

*Primary Examiner*—Bernard Lipman
(74) *Attorney, Agent, or Firm*—Womble Carlyle Sandridge & Rice, PLLC

(57) ABSTRACT

The curable urethane polymer adhesive or coating of the present invention comprises at least one ethylenically unsaturated monomer and in one embodiment an aliphatic conjugated diene monomer, a hydroxy functional monomer, and a colloid having hydroxy functionality and a moiety having isocyanate functionality. The colloid having hydroxy functionality is present with the ethylenically unsaturated monomer and the hydroxy-functional monomer during polymerization so as to become incorporated into the latex to provide stabilization.

21 Claims, No Drawings

CURABLE URETHANE POLYMER ADHESIVES AND COATINGS

CROSS-REFERENCE TO RELATED APPLICATIONS

This application claims the benefit of, and incorporates herein by reference in its entirety, the following U.S. Provisional Application No. 60/622,635, filed Oct. 27, 2004.

FIELD OF THE INVENTION

The present invention relates to a curable urethane polymer adhesive or coating based on a colloid stabilized latex.

BACKGROUND OF THE INVENTION

Adhesives, sealants, foams and coatings have use in a variety of uses in wood, masonry, and other construction materials. Such adhesives and the like often need to have high strength of bond and ability to withstand boiling water.

SUMMARY OF THE INVENTION

The present invention provides an adhesive or coating having improved tensile strength and elasticity and has improved water resistance. Such a stabilized latex based adhesive is particularly suitable for wood adhesives wherein strength of bond and ability to withstand boiling water are important attributes. Other exemplary uses are as structural adhesives, sealants, foams, coatings for masonry and construction, and the like.

The curable urethane polymer adhesive or coating of the invention comprises a latex crosslinked with a moiety having isocyanate functionality. The latex comprises at least one ethylenically unsaturated monomer, a hydroxy functional monomer, and a colloid having hydroxy functionality.

DETAILED DESCRIPTION OF THE INVENTION

The curable urethane polymer adhesive or coating of the present invention comprises at least one ethylenically unsaturated monomer, a hydroxy functional monomer, and a colloid having hydroxy functionality and a moiety having isocyanate functionality. The colloid having hydroxy functionality is present with the ethylenically unsaturated monomer and the hydroxy-functional monomer during polymerization so as to become incorporated into the latex to provide stabilization.

Various ethylenically unsaturated monomers may be used in the latex. Examples of monomers can be found in U.S. Pat. No. 5,830,934 to Krishnan, the disclosure of which is incorporated herein by reference in its entirety. Such monomers include, but are not limited to, vinyl aromatic monomers (e.g., styrene, para methyl styrene, chloromethyl styrene, vinyl toluene); olefins (e.g., ethylene); aliphatic conjugated diene monomers (e.g., butadiene); non-aromatic unsaturated mono- or dicarboxylic ester monomers (e.g., methyl methacrylate, ethyl acrylate, butyl acrylate, butyl methacrylate, glycidyl methacrylate, isodecyl acrylate, lauryl acrylate); monomers based on the half ester of an unsaturated dicarboxylic acid monomer (e.g., monomethyl maleate); unsaturated mono- or dicarboxylic acid monomers and derivatives thereof (e.g., itaconic acid); and nitrogen-containing monomers (e.g., acrylonitrile, methacrylonitrile, acrylamide, methacrylamide, N-methylol acrylamide, and N-(isobutoxymethyl) acrylamide). Mixtures of the above may be used.

The ethylenically unsaturated aromatic monomer is used, in an amount, based on total weight of the starting monomers, from about 1 to 99 percent by weight, often from about 5 to 70 percent by weight and more often from about 10 to 60 percent by weight.

In an embodiment, an ethylenically unsaturated aromatic monomer and an aliphatic conjugated diene monomer are present. Suitable ethylenically unsaturated aromatic monomers include, for example, styrene and styrene derivatives such as α-methyl styrene, p-methyl styrene, divinyl benzene, divinyl toluene, ethyl styrene, vinyl toluene, tert-butyl styrene, monochloro styrenes, dichlorostyrenes, vinyl benzyl chlorides, fluorostyrenes, tribromostyrenes, tetrabromostyrenes and alkoxystyrenes.

Suitable aliphatic conjugated diene monomers include $C_4$ to $C_9$ dienes, for example, butadiene monomers such as 1,3-butadiene, 2-methyl-1,3-butadiene, 2 chloro-1,3-butadiene, and the like, such as described in U.S. Pat. No. 5,900,451 to Krishnan et al., the disclosure of which is incorporated herein by reference in its entirety. The aliphatic conjugated diene is used in an amount, based on total weight of the starting monomers, from about to 1 to 99 percent by weight, often from about 5 to 70 percent by weight, and most often from about to 10 to 60 percent by weight. In a preferred embodiment, styrene and 1,3-butadiene are used.

Exemplary colloids having hydroxy functionality include polyvinyl alcohols, glycols (e.g., polyethylene glycol and polypropylene glycol), hydroxyethyl cellulose and the like. Polyvinyl alcohols are preferred and can be partially or fully hydrolyzed. Such polyvinyl alcohols are available from Celanese, sold under the trademark Celvol™ and are often employed from about 0.1 to 10 percent based on the weight of the total monomer, more often from about 1 to 8 percent, and most often from about 2 to 6 percent.

Suitable hydroxy functional monomers include hydroxy acrylates and methacrylates such as hydroxyethyl acrylate and methacrylate, hydroxypropyl acrylate and methacrylate, and the like. Such hydroxyl functional monomers are employed from about 0.5 to 15 percent based on the weight of the total monomer, more often from about 1 to 10 percent, and most often from about 1 to 5 percent.

Suitable moieties (monomers, polymers, prepolymers or oligomers) having isocyanate functionality include diisocyanates, and aromatic and aliphatic polyisocyanates. Preferred diisocyanates include 4,4'-diphenylmethane diisocyanate, 4,4'-diphenylether diisocyanate, 2,4-tolylene diisocyanate, 2,2,4-trimethylhexamethylene diisocyanate, 3-isocyanatemethyl-3,5,5-trimethylcyclohexyl isocyanate, 1,6-hexamethylene diisocyanate, 1,4-butane diisocyanate, 1,6-hexane diisocyanate, isophorone diisocyanate, and 1,3- and 1,4-cyclohexane diisocyanate. Such moieties having isocyanate functionality are typically employed in a 1:1 molar ratio with the hydroxyl functional monomers and are employed from about 0.5 to 15 percent based on the weight of the total monomer, more often from about 1 to 10 percent, and most often from about 1 to 5 percent.

Various additives may be included to enhance various physical and mechanical properties such as described in U.S. Pat. No. 5,830,934 to Krishnan, the disclosure of which is incorporated by reference in its entirety.

Initiators which facilitate polymerization are typically used and include, for example, materials such as persulfates, organic peroxides, peresters, and azo compounds such as azobis(isobutyronitrile) (AIBN). Persulfate initiators are preferred and include, for example, potassium persulfate and ammonium persulfate.

Reductants may be employed in the polymerization, and are typically employed in combination with the initiator as part of a redox system. Suitable reductants include sodium bisulfite, erythorbic acid, ascorbic acid, sodium thiosulfate, sodium formaldehyde sulfoxylate (SFS), and the like.

Other additives which may be used include other natural and synthetic binders, fixing agents, wetting agents, plasticizers (e.g., diisodecyl phthalate), softeners, foam-inhibiting agents, froth aids, other crosslinking agents (e.g., melamine formaldehyde resin, epoxies, polyisocyanates, etc.), flame retardants, dispersing agents (e.g., tetrasodium pyrophosphate), pH-adjusting components (e.g., ammonium hydroxide), sequestering or chelating agents (e.g., ethylene diaminetetraacetic acid (EDTA)) and other components. The selection of any of these additives is readily apparent to one skilled in the art.

The adhesives or coatings can be used with a wide variety of substrates including cellulosic materials (e.g., wood), concrete, masonry, glass, metal, ceramics, fabrics, foams, films and organic and inorganic particulates, fibers and agglomerates. The method of use of the adhesive or coating such as the application onto the substrate, e.g., coating, spraying and the like, will be within the skill of one in the art.

The following Examples are provided to illustrate the present invention and should be not regarded as limiting.

EXAMPLES

Example 1

Example 1 is prepared comprising the following:

| Component | Percentage |
|---|---|
| Styrene | 58.0 |
| Butadiene | 33.5 |
| Itaconic acid | 1.5 |
| Hydroxyethyl acrylate | 5.0 |
| Polyvinyl alcohol | 1.75 |

Bayhydur 302, a water dispersable polyisocyanate based on HDI available from Bayer Co., Pittsburgh, Pa. is added in amounts according to Table 1.

Comparative Example 1

Comparative Example 1 is prepared comprising the following:

| Component | Percentage |
|---|---|
| Styrene | 62.4 |
| Butadiene | 33.3 |
| Itaconic acid | 1.7 |
| Hydroxyethyl acrylate | 2.6 |

Bayhydur 302 is added in amounts according to Table 1.

TABLE 1

| | Dry Parts | | | | | |
|---|---|---|---|---|---|---|
| Polymers | | | | | | |
| Comparative Example 1 | 100 | 100 | 100 | | | |
| Example 1 | | | | 100 | 100 | 100 |
| Bayhydur 302 | | 5 | 10 | | 5 | 10 |
| Viscosity | | | | | | |
| Polymer neat | 120 | | | 1750 | | |
| 5 minute | | 130 | 150 | | 2195 | 3220 |
| 1 hr | | 130 | 145 | | NA | NA |
| 3 hr | | 130 | 145 | | 10,240 | 47,000 (gelled) |
| 24 hr | | 125 | 65 | | 13,150 | gelled |
| Water Spot Rub Condition 24 hr | | | | | | |
| Time (sec)/Color (0-10 clear to white) | 15/7 | 60/3 | >120/3 | 3/9 | 80/3 | >120/<1 |
| 7 Day CTH condition | | | | | | |
| Tensile Strength dry (psi) | 1117 | 1107 | 544 | 337 | 752 | 827 |
| Elongation dry (%) | 329 | 275 | 378 | 551 | 324 | 242 |
| 7 Day Wet condition | | | | | | |
| Tensile Strength wet (psi) | 544 (5 day) | 529 (5 day) | 540 (5 day) | 36 | 203 | 185 |
| Elongation wet (%) | 274 (5 day) | 199 (5 day) | 461 (5 day) | 0 | 72 | 40 |
| Water Gain 3 day (%) | 12.0 (1 day) | 9.3 (1 day) | 10.5 (1 day) | 53.0 | 31.7 | 26.4 |
| Solvent Swell 1 hour | | | | | | |
| MEK % swell | 45 | 40 | 60 | 70 | 42 | 38 |
| Toluene % swell | gel | 50(gel) | 50(gel) | 50 | 50 | 70 |

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

The invention claimed is:

1. A curable urethane polymer adhesive or coating consisting essentially of:
  a latex comprising at least one ethylenically unsaturated monomer and an aliphatic conjugated diene monomer, a hydroxyl functional monomer, and a colloid with hydroxyl functionality selected from the group consisting of polyvinyl alcohols, glycols and hydroxethyl cellulose, present with the ethylenically unsaturated monomer and hydroxyl functional monomer during polymerization so as to become incorporated into the latex; and
  a moiety having isocyanate functionality.

2. The curable urethane polymer adhesive or coating according to claim 1, wherein the latex comprises styrene, 1,3-butadiene, hydroxyethyl acrylate and a polyvinyl alcohol.

3. The curable urethane polymer adhesive or coating according to claim 1, wherein the moiety having isocyanate functionality is selected from the group consisting of aromatic or aliphatic polyisocyanates, 4,4'-diphenylmethane diisocyanate, 4,4'-diphenylether diisocyanate, 2,4-tolylene diisocyanate, 2,2,4-trimethylhexamethylene diisocyanate, 3-isocyanatemethyl-3,5,5-trimethylcyclohexyl isocyanate, 1,6-hexamethylene diisocyanate, 1,4-butane diisocyanate, 1,6-hexane diisocyanate, isophorone diisocyanate, and 1,3- and 1,4-cyclohexane diisocyanate.

4. A curable urethane polymer adhesive or coating according to claim 1, wherein said hydroxy functional monomer is a hydroxy acrylate or methacrylate.

5. A curable urethane polymer adhesive or coating according to claim 1, wherein the aliphatic conjugated diene monomer is a $C_4$ to $C_9$ diene.

6. A substrate having the adhesive or coating of claim 1 applied thereto.

7. The substrate according to claim 6, wherein the substrate is selected from the group consisting of cellulosic materials, concrete, masonry, glass, metal, ceramics, fabrics, foams, films, organic and inorganic particulates, fibers and agglomerates.

8. A curable urethane polymer adhesive or coating consisting essentially of:
  a latex comprising 1 to 99 percent by weight of at least one ethylenically unsaturated monomer and an aliphatic conjugated diene monomer, 0.5 to 15 percent by weight of a hydroxy functional monomer, and 0.1 to 10 percent by weight of a colloid with hydroxy functionality selected from the group consisting of polyvinyl alcohols, glycols and hydroxyethyl cellulose, present with the ethylenically unsaturated monomer and hydroxy functional monomer during polymerization so as to become incorporated into the latex; and
  0.5 to 15 percent by weight of a moiety having isocyanate functionality.

9. The curable urethane polymer adhesive or coating according to claim 8, wherein the latex comprises styrene, 1,3-butadiene, hydroxyethyl acrylate and a polyvinyl alcohol.

10. The curable urethane polymer adhesive or coating according to claim 8, wherein the moiety having isocyanate functionality is selected from the group consisting of aromatic or aliphatic polyisocyanates, 4,4'-diphenylmethane diisocyanate, 4,4'-diphenylether diisocyanate, 2,4-tolylene diisocyanate, 2,2,4-trimethylhexamethylene diisocyanate, 3-isocyanatemethyl-3,5,5-trimethylcyclohexyl isocyanate, 1,6-hexamethylene diisocyanate, 1,4-butane diisocyanate, 1,6-hexane diisocyanate, isophorone diisocyanate, and 1,3- and 1,4-cyclohexane diisocyanate.

11. A curable urethane polymer adhesive or coating according to claim 8, wherein said hydroxy functional monomer is a hydroxyl acrylate or methacrylate.

12. A curable urethane polymer adhesive or coating according to claim 8, wherein the aliphatic conjugated diene monomer is a $C_4$ to $C_9$ diene.

13. A substrate having the adhesive or coating of claim 8, applied thereto.

14. The substrate according to claim 13, wherein the substrate is selected from the group consisting of cellulosic materials, concrete, masonry, glass, metal, ceramics, fabrics, foams, films, organic and inorganic particulates, fibers and agglomerates.

15. A curable urethane polymer adhesive or coating consisting essentially of:
  a latex comprising at least one ethylenically unsaturated monomer, a hydroxyl functional monomer, and a colloid with hydroxy functionality selected from the group consisting of polyvinyl alcohols, glycols and hydroxyethyl cellulose, present with the ethylenically unsaturated monomer and hydroxy functional monomer during polymerization so as to become incorporated into the latex; and
  a moiety having isocyanate functionality.

16. The curable urethane polymer adhesive or coating according to claim 15, wherein the latex comprises styrene, 1,3-butadiene, hydroxyethyl acrylate and a polyvinyl alcohol.

17. A curable urethane polymer adhesive or coating according to claim 15, wherein said hydroxy functional monomer is a hydroxy acrylate or methacrylate.

18. A curable urethane polymer adhesive or coating according to claim 15, wherein an aliphatic conjugated diene monomer is present with said at least one ethylenically unsaturated monomer.

19. A curable urethane polymer adhesive or coating according to claim 18, wherein the aliphatic conjugated diene monomer is a $C_4$ to $C_9$ diene.

20. A substrate having the adhesive or coating of claim 15, applied thereto.

21. The substrate according to claim 20, wherein the substrate is selected from the group consisting of cellulosic materials, concrete, masonry, glass, metal, ceramics, fabrics, foams, films, organic and inorganic particulates, fibers and agglomerates.

* * * * *